Aug. 29, 1972    J. R. SCHEDER    3,687,682
PROCESS FOR THE TREATMENT OF LIQUID WHEY
Filed Aug. 5, 1970    2 Sheets-Sheet 1

INVENTOR.
John R. Scheder
BY Howard E. Russell
ATTORNEY

United States Patent Office 3,687,682
Patented Aug. 29, 1972

3,687,682
PROCESS FOR THE TREATMENT OF
LIQUID WHEY
John R. Scheder, Horicon, Wis., assignor to Purity
Electrochemicals Company, Mayville, Wis.
Filed Aug. 5, 1970, Ser. No. 61,168
Int. Cl. A23c 21/00; B01d 13/02
U.S. Cl. 99—57
3 Claims

ABSTRACT OF THE DISCLOSURE

High degrees of demineralization of liquid whey without denaturation of whey protein are attained by first deionizing liquid whey of less than 20 percent solids content to effect a reduction of the ash content in excess of 65 percent followed by concentration of the demineralized whey to a solids content of more than 50 percent and removal of crystallized lactose, the deionization being carried out in a cell containing cation membranes and neutral membranes.

---

The present invention relates to improvements in methods of producing an edible protein product from liquid whey, a by-product of cheese making.

Several processes are known for partially removing salt and lactose from the whey solution to produce a palatable product having a protein content of over 20 percent.

The known processes may be divided into two groups:

According to one basic approach, the whey liquid is first concentrated to a solids content of about 25 percent in an evaporator, is then demineralized by about 60 to 65 percent, followed by concentration to about 60 percent solids content, at which level lactose crystallizes out. Lactose and whey protein are then separated, whereupon the lactose-reduced whey is dried.

According to another basic approach the raw whey is first demineralized by electrodialysis by about 60 to 65 percent which the art considers an upper limit above which protein is rendered insoluble. The demineralized whey solution is then concentrated to about 60 percent solids content to effect crystallization of lactose. Crystallized lactose is separated from the protein solution which is dried or treated further.

In all known processes, as far as I am aware, demineralization (sometimes also referred to as "ash removal") is carried out in a multi-chamber electrodialysis cell comprising anion membranes and cation membranes in alternating sequence between a pair of terminal electrodes carrying a direct potential.

For some of the known processes quantitatively favorable results are reported, which, as far as my experience with extended operation suggests, are difficult to realize consistently in large-scale operation.

Difficulties are encountered which, in the carrying out of laboratory-scale processes, appear far less for bidding than they are in large-scale operation.

In the use of electrodialysis cells with anion membranes and cation membranes three major difficulties are experienced:

Firstly, anion membranes tend to collect protein molecules in their pores. The cause of this phenomenon appears to be the fixed positive charges in the membrane structure. The fixed charges attract whey proteins which carry a negative charge and become caught in the membrane structure and obstruct the membrane pores.

Secondly, I observed that anion membranes polarize at considerably lower current densities than cation membranes. This phenomenon involves an extraordinary depletion in solution anions of the liquid zone immediately adjacent the face of the membrane through which the solution anions pass. The electrical conductivity of the liquid layer decreases sharply and, as a consequence, causes water molecules to split into hydrogen and hydroxyl ions. Hydroxyl ions pass through the anion membranes which therefore perform their desalting function poorly.

Thirdly, problems are caused by protein precipitation at the anion membrane surface—a phenomenon distinct from the clogging of membrane pores by non-precipitated protein molecules—though similar in the effect of imparing the cell performance.

I discovered that the aforementioned anion membrane problems are avoidable by replacement of the anion membranes by neutral membranes.

The basic concept of fitting an electrodialysis cell with cation membranes and neutral membranes, or anion membranes and neutral membranes, as the case may be, is disclosed in the prior patent to Kollsman 2,872,407. Kollsman discovered that the lack of neutral membranes, to resist passage of ions of one of opposite polarity is compensated for by the inherent tendency of an ionic solution to maintain its ionic balance in the sense that removal of an ion of one polarity from a volume of liquid is predicated on the simultaneous removal from the volume of an ion of the opposite polarity therefrom.

The performance of a cell fitted with selective ion exchange membranes of one kind and neutral membranes is similar to the performance of a cell fitted with selective anion and cation exchange membranes, only in that both cells are capable of deionizing a liquid.

But the two cells are not equivalent when employed for the deionization of whey in that they perform their similar office or function of deionizing in different manners, with attendant different primary and secondary results.

Neutral membranes do not possess fixed positive charges, hence do not attract negative protein molecules. This disposes of the pore-clogging-by-charge-attraction problem.

Neutral membranes do not polarize and, when paired with cation membranes, polarization problems of the cell are not significant due to the fact that cation membranes polarize only at relatively high current densities which can readily be avoided.

On the other hand, neutral membranes, in distinction from anion membranes, are capable of passing hydrogen ions. In certain instances this may give rise to calcium precipitation in the cell. But this undesirable phenomenon poses no insurmountable operational problem, since there exists an effective countermeasure, as disclosed in my copending patent application Ser. No. 802,766, filed Feb. 27, 1969, now Patent 3,595,766.

Comparison of the conventional anion/cation membranes cell with the cation/neutral membranes cell therefore indicates that the cells are nonequivalent because of the distinct manners in which they perform their similar functions and because of the distinct by-products, such as precipitates, produced by them.

A further major problem encountered in the preparation of palatable protein from whey by known practices is the denaturation of whey protein.

I observed two principal causes for denaturation in known processes: acidity and heat.

Concentration of solids of the whey liquid is accompanied by an increase in acidity of the liquid which, in turn, promotes protein denaturation.

Also, the heating of the whey liquid incidental to evaporation concentration promotes denaturation.

As far as I am aware, it has been consistent prior practice to subject raw liquid whey containing about 6 percent solids to concentration before demineralization, because concentration increases the conductivity of the liquid and results in gains in electrical economy. Published reports deal with preconcentration of the order of 25 percent solids.

I have observed that the desirable attainment of increased conductivity is counteracted by an undesirable increase in denaturation of the protein.

Denaturation of whey protein is undesirable for several reasons. Denatured whey protein possesses changed physical characteristics, such as reduced water binding capacity, it undergoes a change in viscosity and a change in taste and mouth feel.

Denaturation of whey protein is particularly objectionable in the demineralization step as protein settles out in different portions of the cell. Particularly, substantial accumulations of solids occur in areas where there is a change in the velocity of the liquid flowing through the stack, for example at passage constructions.

It has, for this reason, been proposed to subject the whey protein solution to the additional step of clarification. Clarification is carried out prior to electrodialysis and involves centrifuging of the solution to separate out denatured protein which is removed as a sludge.

In order to overcome the aforementioned problem, I demineralize whey solution of a solids content of less than 20 percent, preferably within the range of 6 to 12 percent solids and perform tthe demineralization in a cell comprising cation membranes and neutral membranes.

It is known in this connection to demineralize non-preconcentrated raw whey to remove about 60 to 65% of the whey ash in a cell containing anion membranes and cation memberanes in alternating sequence. In his United States Patent 3,166,486, Hull reports on the results obtained, including a problem encountered in the form of insolubilization of proteins which reportedly occurs if the 60 to 65 percent demineralization is exceeded prior to removal of lactose by crystallization.

I found that the problem of insolubilization of proteins is not encountered in a cell in which the anion membranes are replaced by neutral membranes. The reason appears to be connected with the polarization normally occurring at the anion membranes, particularly, the generation of hydrogen.

In distinction to Hull's experience with conventional anion-cation membrane cells and his operational limitation to 60 to 65 percent ash removal, I find it therefore advantageous to operate with a cell in which the anion membranes are replaced by neutral membranes permitting successful operation even at or above the 65% level for reasons later to be explained and illustrated by a graph.

The results of my tests have been consistent and prove that demineralization of non-preconcentrated whey or whey of a concentration of less than 20 percent can be carried out to remove ash considerably in excess of 70 percent, for example to 90 percent, without denaturation of the protein and without the precipitation problems previously encountered and reported on by Hull.

The range whose upper limit is 20 percent of solids and which includes a preferred zone of between 6 and 12 percent solids permits the treatment of sweet as well as acid whey solutions. In the treatment of sweet wheys the upper portion of the given range is suitable without danger of denaturation. For acid wheys operation within the lower portion of the range is preferred with 12 percent as a safe upper limit.

The 20 percent limit was arrived at by my discovery that at a solids content exceeding 20 percent the gain due to improved current economy resulting from reduced resistivity of the liquid stream is outweighed by losses due to denaturation.

In this respect my discovery differs markedly from previous practices and teachings which involve pre-concentration of the whey solids by approximately 25% total solids.

In this connection, Francis in his United States Patent 3,447,930 reports on his experience leading to the conclusion that solids concentration should be carried out to at least 20 percent solids, preferably 20 to 30 percent solids. In addition, Francis corroborates the existence of the protein denaturation problem which my improved process avoids effectively.

Referring to the drawings.

Figure 1:
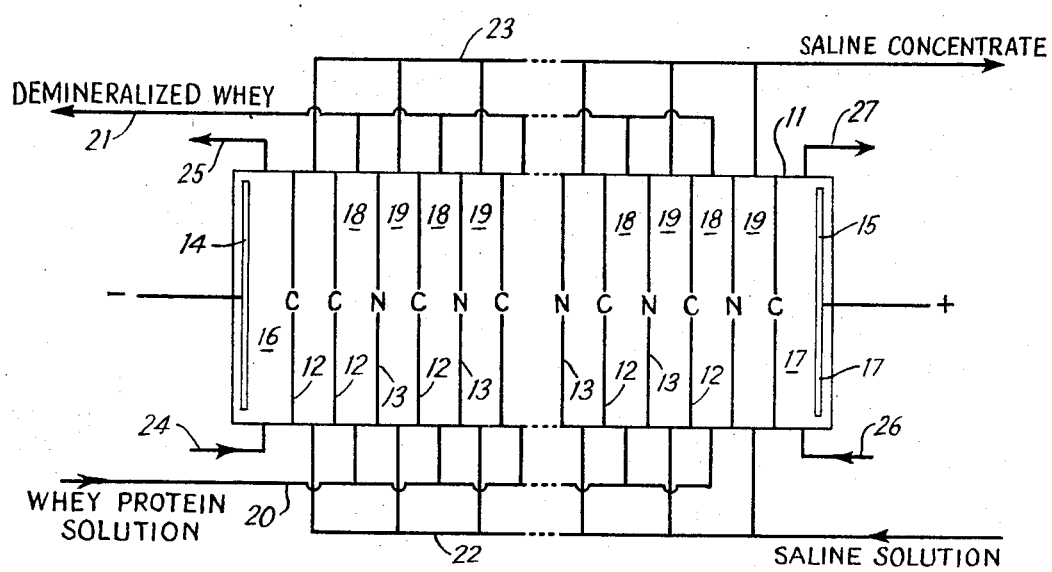
FIG. 1 is a diagrammatic representation of a representative form of multimembrane cell for treating whey protein solution.

A representative form of electrodialysis cell for demineralizing whey protein solution is shown in FIG. 1.

The cell 11 comprises cation membranes 12 and neutral membrances 13 arranged in alternating sequence. A cathode 14 and an anode 15 are located in electrode chambers 16 and 17, respectively. By reason of this arrangement chambers 18 become demineralization chambers and chambers 19 become concentration chambers.

Whey protein solution enters through a manifold duct 20 and demineralized solution leaves through product duct 21. Saline solution is supplied through a manifold duct 22 and saline concentrate leaves through duct 23. Electrolyte passes through the electrolyte chambers 16 and 17 through ducts 24, 25 and 26, 27, respectively.

Figure 2:
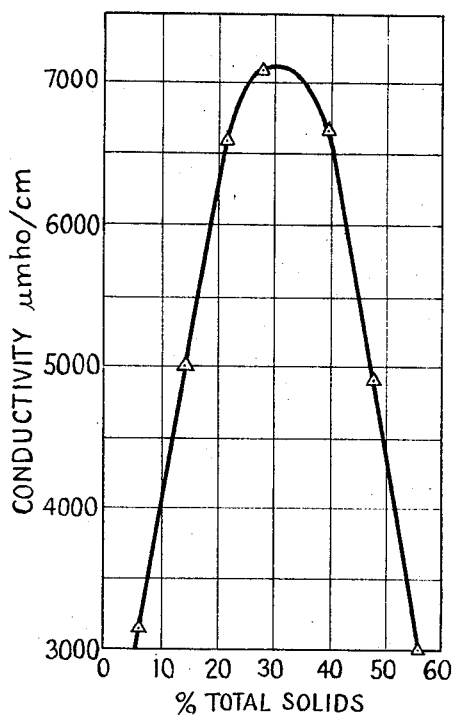
FIG. 2 is a graph illustrating changes in the conductivity of a representative sweet whey in dependence on its concentration of total solids.

Turning first to the changes in the conductivity of whey resulting from increases in the total solids content, the curve of FIG. 2 shows that conductivity is more than doubled by concentration of the solids content from the original 6 percent to an optimum of about 28 percent. Beyond the optimum the conductivity declines.

For this reason it was previously considered desirable to concentrate the raw whey to about 20 to 25 percent solids content prior to ash removal by electrodialysis, the principal purpose being an improvement in current economy.

Figure 3:
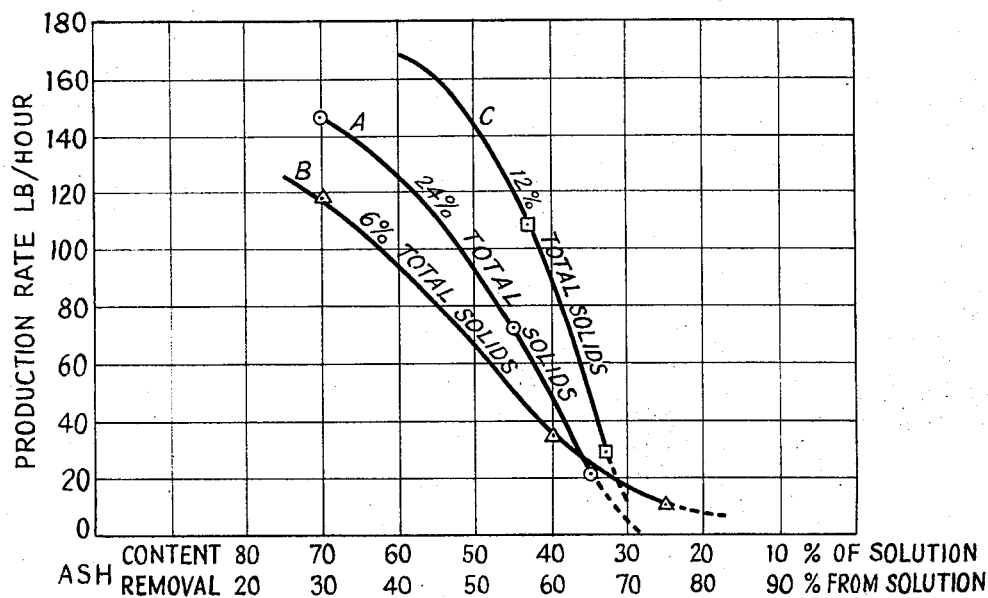
FIG. 3 is a graph illustrating representative production rates, in terms of pounds per hour, in dependence on ash content and ash removal, respectively, for wheys of a total solids content of 24, 12 and 6 percent, respectively.

I discovered that the aim of attaining maximum energy economy is of dubious merit in the production of lactose reduced whey. This is illustrated by FIG. 3 in which the production rate, in terms of pounds per hour, is plotted against the ash content of the solution, and the corresponding value, ash removal.

It appears from curve A that in the ash removal of whey preconcentrated to a total solids content of 24 percent, the production rate drops rapidly in the range beyond 40 percent ash content or 60 percent ash removal, respectively.

The production rate of whey of a total solids content of 6 percent is lower within the low range of ash removal, as appears from curve B. This could logically be expected. But at about, and beyond, 60 percent of ash removal curve B flattens out and unexpectedly intersects curve A which is relatively steep within this area. It is seen that a high degree of ash removal, for example 75 and 80 percent, is attainable in treating raw whey of a solids content of 6 percent while the same high ash removal is not attainable when treating whey preconcentrated to 24 percent solids content.

This relationship compels the conclusion that a low solids content of the order of 6 to 8 percent is desirable and advantageous where a high degree of ash removal is to be achieved.

Curve C represents the treatment of a whey solution preconcentrated to a solids content of 12 percent. Logically the curve could be expected to lie between curves A and B, but I found it to be on the far side of curve A.

Curve C represents a condition under which considerably higher production rates are attainable than in the treatment of a solution containing 6 percent solids, as can logically be expected. Unexpected, however, was the discovery that the production rates are more favorable for 12 percent solids concentration than for 24 percent solids concentration.

Without wishing to assign with certainty a particular reason for this phenomenon, I am led to conclude that denaturation and the consequent accumulation of solids in the cell, which was experimentally confirmed, and particularly at the membranes, results from the greater heat input required to concentrate to 24 percent solids as against 12 percent.

I therefore conclude that the expected gain from the increase in conductivity (FIG. 2) is more than offset by an increase in total solids preconcentration beyond the 12 percent level.

Figure 4:
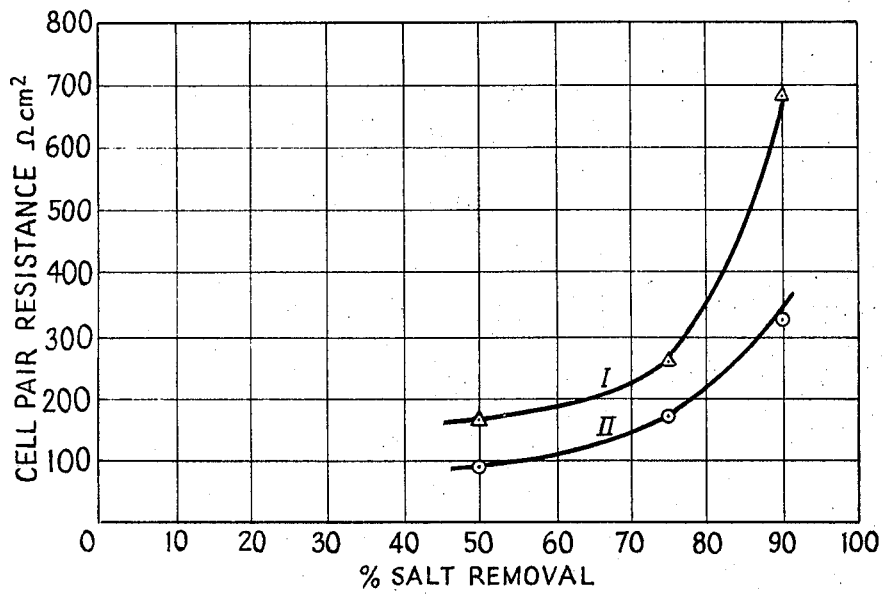
FIG. 4 is a graph comparing cell pair resistance, hence electric economy, of conventional and neutral membrane cells in dependence on salt removal.

FIG. 4 compares electrical economy for different degrees of salt removal in a conventional cell comprising anion membranes and cation membranes and an improved cell in which the anion membranes are replaced by neutral membrane.

The cell economy is expressed in terms of resistivity of chamber pairs, a pair comprising a deionization chamber and the adjacent concentration chamber.

Curve I represents a conventional chamber pair and curve II represents a comparable chamber pair in which a neutral membrane occupies the place of the anion membrane of the conventional cell.

It is seen that the resistance of the improved neutral membrane cell remains considerably below the resistance of the conventional cell, particularly within the range of high degrees of salt removal.

The cause, as previously stated, is the avoidance, in a high degree, of clogging of membrane pores by protein, avoidance of polarization, and avoidance of protein precipitation.

FIG. 4 confirms the unexpected advantage which arises for the preparation of edible protein products from whey protein solution from the use of neutral membrane cells and FIGS. 2 and 3 illustrate the advantages of first demineralizing whey protein solution of a total solids content of 6 to about 12 percent the latter involving a degree of preconcentration for which denaturation of whey protein is negligible. The range of about 5 to 6 percent solids is considered to represent raw unconcentrated whey solution.

What is claimed is:

1. A process for the treatment of liquid whey containing at least 5 percent and less than 20 percent solids, comprising the steps of
    first passing the liquid whey through alternate deionization chambers of a multi-membrane cell comprising cation membranes and neutral membranes in alternating sequence between terminal electrodes carrying a direct electric potential to drive ionic whey ash constituents into the ionic concentration chambers of the cell lying between the demineralization chambers to effect a reduction of the ash content in excess of 65 percent;
    then concentrating the demineralized whey solution to a relative content of solids sufficient to effect crystallization of lactose;
    then removing crystallized lactose from the concentrate to an extent to provide a residual lactose content from 45 to 60 percent (dry solids basis).

2. A process as defined in claim 1 in which the solids content of the liquid whey ranges between the content of raw unconcentrated whey solution to 12 percent of preconcentrated whey.

3. A process as defined in claim 1 in which the demineralized whey is concentrated to a content of solids of the order of 60 percent.

References Cited

UNITED STATES PATENTS

| | | | |
|---|---|---|---|
| 2,872,407 | 2/1959 | Kollsman | 204—301 |
| 3,201,245 | 8/1965 | Clark et al. | 99—57 |
| 2,631,100 | 3/1953 | Aten et al. | 99—57 |
| 3,325,389 | 6/1967 | Parsi et al. | 99—57 |
| 3,166,486 | 1/1965 | Hull | 204—180 P |
| 3,447,830 | 6/1969 | Francis | 204—180 P X |

S. LEON BASHORE, Primary Examiner

F. FREI, Assistant Examiner

U.S. Cl. X.R.

204—180 P